(12) United States Patent
Buchholz

(10) Patent No.: US 8,476,345 B2
(45) Date of Patent: Jul. 2, 2013

(54) USE OF OILY SOFT WAXES AS HYDROPHOBIZING AGENTS IN TIMBER PRODUCTS, TIMBER PRODUCTS THUS PRODUCED, AND PROCESSES FOR INTRODUCING SOFT WAXES INTO TIMBER PRODUCTS

(76) Inventor: Thomas Buchholz, Reppenstedt (DE)

( * ) Notice: Subject to any disclaimer, the term of this patent is extended or adjusted under 35 U.S.C. 154(b) by 23 days.

(21) Appl. No.: 12/305,657

(22) PCT Filed: Jun. 22, 2007

(86) PCT No.: PCT/DE2007/001109
§ 371 (c)(1),
(2), (4) Date: Apr. 28, 2010

(87) PCT Pub. No.: WO2007/147403
PCT Pub. Date: Dec. 27, 2007

(65) Prior Publication Data
US 2010/0215956 A1    Aug. 26, 2010

(30) Foreign Application Priority Data
Jun. 23, 2006  (DE) .......................... 10 2006 029 313

(51) Int. Cl.
*C08H 7/00* (2011.01)
*C08K 5/21* (2006.01)
(52) U.S. Cl.
USPC ................ 524/74; 524/72; 524/211; 106/271
(58) Field of Classification Search
USPC ................................ 524/211, 72, 74; 106/271
See application file for complete search history.

(56) References Cited

U.S. PATENT DOCUMENTS

| | | | |
|---|---|---|---|
| 3,660,334 A | 5/1972 | Apikos | |
| 4,043,829 A | 8/1977 | Ratledge et al. | |
| 5,817,369 A | 10/1998 | Conradie et al. | |
| 6,183,849 B1 | 2/2001 | Lindsay et al. | |
| 2004/0139885 A1* | 7/2004 | Hudson et al. | 106/270 |

FOREIGN PATENT DOCUMENTS

| | | |
|---|---|---|
| EP | 1448345 B1 | 6/2003 |
| GB | 1312314 A | 4/1973 |
| JP | 11-188708 | 7/1999 |
| SU | 1613333 A1 | 12/1990 |
| WO | WO2004/065488 A1 | 8/2004 |

OTHER PUBLICATIONS

English translation of SU 1613333. Dec. 1990.*
Roffael, E., Shriever, E., May, H.-A., Adhasion 11 (1982) S. 10-19 "Hydrophobierung von Spanplatten mit Paraffinen" Teil 1.
Roffael, E., May, H.-A., Adhasion 28 (1,2), 17-21 "Hydrophobierung von Spanplatten mit Paraffinen" Teil 4, 1984.
W.E. Hsu, R.J. Melanson, P.J. Kozak "The effect of wax type and content on waferboard properties" Proceedings 25th international symposium on particle board, 1990, pp. 85-93.
Roffael, E., May, H.-A. "Paraffin sizing of particleboards—chemical aspects" Washington State University, Pullman/Wash. 1983.

* cited by examiner

*Primary Examiner* — John Uselding
(74) *Attorney, Agent, or Firm* — Bushman & Associates, P.C.

(57) ABSTRACT

An aqueous wax dispersion comprising a soft wax having an oil content of greater than 20 wt % and from 0.5 wt % to 10 wt % urea for use as a hydrophobizing agent in the production of timber products. The soft wax has a softening point of less than 65° C. and is solid at about 10° C. and below.

30 Claims, 1 Drawing Sheet

US 8,476,345 B2

USE OF OILY SOFT WAXES AS HYDROPHOBIZING AGENTS IN TIMBER PRODUCTS, TIMBER PRODUCTS THUS PRODUCED, AND PROCESSES FOR INTRODUCING SOFT WAXES INTO TIMBER PRODUCTS

CROSS REFERENCE TO RELATED APPLICATION

This application claims the priority of DE 102006029313.4 filed on 23 Jun. 2006, the disclosure of which is incorporated herein by reference for all purposes.

FIELD OF THE INVENTION

The subject matter of the invention is the use of wax dispersions containing oily waxes as hydrophobizing agents in the production of wood-based products and/or in the wood-based products thereby produced. The invention relates to the production of hydrophobized wood-based products in particular using wax dispersions of paraffinic soft waxes which are formed either in the petroleum refining process or in the wake of removal of oil from waxes and the wood-based products produced in this way. Soft waxes in the sense of the invention are paraffinic waxes containing more than 20 wt % oil.

BACKGROUND OF THE INVENTION

Waxes are a class of substances defined by their mechanical and physical properties. A substance mixture having the oil content indicated above is referred to in the sense of this invention as a wax and/or a soft wax if it is solid at a temperature above 10° C., in particular at greater than 25° C., e.g., from deformably soft to kneadable to breakable, and has a softening point of less than 65° C. (each at standard pressure, 1013 mbar). Waxes are also characterized by their oil content, melting point and/or viscosity.

Soft waxes having an oil content of more than 20 wt % have not previously been considered suitable for and/or in wood-based materials, e.g., as hydrophobizing agents, because their hydrophobizing effect is too low. This is true in particular if less than 0.5 wt % soft wax is added in relation to the amount of wood and/or wood constituents by weight.

The efficacy of the waxes as hydrophobizing agents depends very much on their chemical composition. For example, it is known that n-paraffins have a much stronger hydrophobizing effect than isoparaffins. Furthermore, reference is made to the publication by E. Roffael, E. Schriever, H.-A. May, "Hydrophobizing of Particleboard with Paraffin, Part 1: Findings and authors' Own Research," *Adhäsion* 11 (1982), pp. 10-19, and to the publication by H.-A. May and E. Roffael, "Hydrophobizing of Particleboard with Paraffins," Part 4 Adhäsion 28 (1, 2)17-21, according to which it was found that the hydrophobizing effect of paraffins increases with an increase in chain length in the range between C20 and C36. It is also known from this publication that the hydrophobizing effect becomes worse beyond a certain oil content.

See also FIG. 3 in W. E. Hsu, R. J. Melanson and P. J. Kozak, "The Effect of Wax Type and Content on Waferboard Properties" in *Proceedings*, Twenty-Fifth International Symposium on Particleboard and Composite Materials; 1990: pages 85-93, editor T. M. Maloney, Washington State University, W. A. Pullman.

U.S. Pat. No. 6,183,849 describes a method for producing composite boards in which the oil content of the wax is more than 30 wt % to 98 wt %. From the examples cited, the negative influence of using oil alone as a hydrophobizing agent is especially apparent. Wood-based materials containing wax with an oil content of 98% have a much greater swelling in thickness than do those containing a slack wax with an oil content of 17.6%.

WO 2004/065488-A1 proposes that oily waxes should be added to other waxes in such a way that the wax to be used as the hydrophobizing agent contains at least 21% n-paraffin.

It is known from SU 1613333 A1 that a mixture containing paraffin, borox, oleic acid, urea, kaolin, ammonium hexafluorosilicate, urea-formaldehyde resin, casein, water glass and water may be used for hydrophobizing OSB (oriented strandboard) in which the oil content of the paraffin used is 4% and its melting point is 72° C. According to SU-A1-1613333, a low-oil-content wax (4% oil content) that also contains urea is improved in its hydrophobizing effect by the addition of several other components, where the improvement in properties is not related to the urea addition. SU 1613333 A1 therefore does not relate to improving the hydrophobizing effect of soft wax having an oil content of greater than 20 wt %.

In extraction of oil from wax, fractions having a higher oil content are obtained. Since such high-oil-content soft waxes have a weak hydrophobizing effect, the object of the present invention was to improve the hydrophobizing effect of such soft waxes and to thereby make them available as hydrophobizing agents for wood-based materials. Waxes such as those obtained as high-oil-content "foots oils" or high-oil-content "slack wax" should be available for use as hydrophobizing agents in particular.

SUMMARY OF THE INVENTION

It has surprisingly been found that the addition of carboxylic acid amide compounds to soft waxes increases the hydrophobizing effect and in this way improves the technological physical properties of the wood-based materials produced with them. The invention is characterized by the independent claims. Preferred embodiments are the subject matter of the subclaims or are described below.

DESCRIPTION OF PREFERRED EMBODIMENTS

Figure 1:
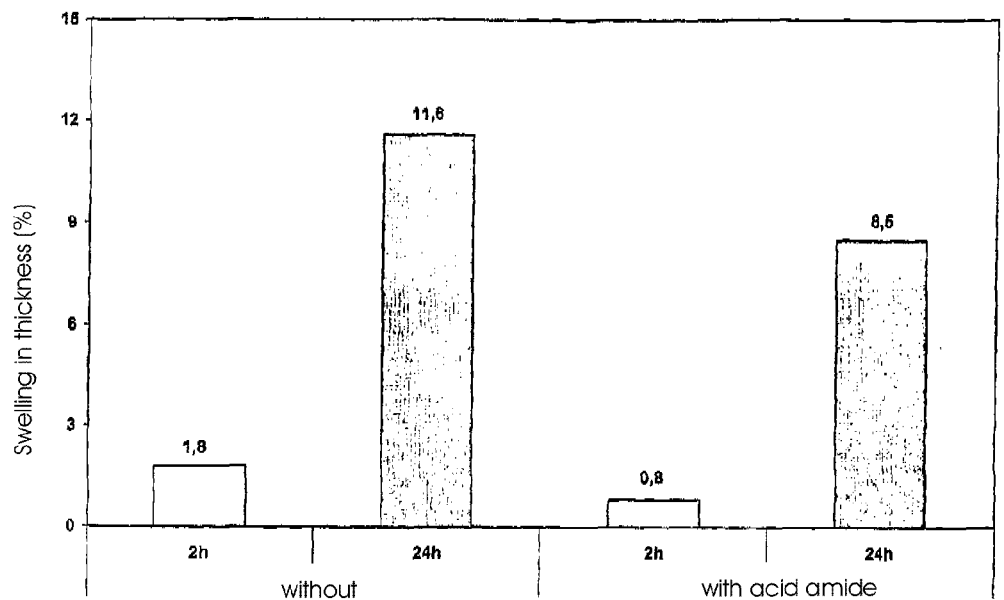
FIG. 1 is a graph showing the swelling and thickness of wood fiberboard with and without treatment with the composition of the present invention for 2 and 24 hour periods.

The soft waxes according to the present invention are solid mixtures of solid paraffins and hydrocarbons that are liquids per se (according to the oil, i.e., the oil content). More specifically, the subject matter of the present invention is paraffinic soft waxes having a softening point of up to 65° C. as a mixture.

In addition to the waxes, which usually have a higher melting point (e.g., taken together, higher than 40° C. for an amount of greater than 65 wt %), these also contain low-molecular hydrocarbons (oil content) which are liquid at room temperature (25° C.). The soft waxes here may be obtainable from and/or may contain petroleum waxes, i.e., from geological sources and/or from artificially synthesized waxes, so-called synthetic waxes.

The n-paraffin, isoparaffin and oil content of waxes are subject to fluctuations, depending on the source of the petroleum and the type of refining process. A distinction is made in general between so-called hard waxes and so-called soft waxes. Soft waxes comprise mainly n-paraffins, isoparaffins and hydrocarbons that are liquid at room temperature (oil). The lower end of soft waxes with regard to solidification point is formed by so-called "foots oils" with a melting point and/or melting range of 35° C. to 45° C., which have a relatively high oil content, and the upper end is formed by "slack waxes" with a melting point of 35° C. to less than 65° C., for example. Depending on the source of the wax, the oil content here may be up to approximately 35 wt %, for example.

High-oil-content foots oils are obtained in extracting the oil from slack waxes. The foots oils may have oil contents greater than 30 wt %. In the sense of the present invention the soft waxes may be slack wax or foots oil as long as they contain more than 20 wt % oil, preferably more than 25 wt % oil and in particular more than 30 wt % oil. The oil content may be adjusted by adding hydrocarbons, e.g., such as those typically used for lubricating oils.

Soft waxes typically have a density between 0.80 and 0.85 g/cm$^3$ and on the average (number average) have hydrocarbons with more than 16 carbon atoms.

According to the invention, soft waxes obtained from petroleum, for example, are used as hydrophobizing agents. Fischer-Tropsch waxes (FT waxes) and polyolefin waxes of synthetic origin may also be used for this purpose. These waxes may be added in the form of an aqueous dispersion to the wood shaving products for production of the wood-based products.

The soft waxes may be used in mixtures with other waxes as hydrophobizing agents. The amount of urea is between 0.01 and 10 wt %, preferably up to 1 to 8 wt % and in particular between 2 and 5 wt % (based on the dispersion containing the soft wax.)

According to the invention, it does not matter much whether the carboxylic acid amide is added to the oily wax before, during or after production of the wax dispersion. It is also possible to add only one portion of carboxylic acid amide before production of the wax dispersion and to add another portion after production of the wax dispersion. It is also possible to produce the wax dispersion in an aqueous solution of the carboxylic acid amide. Furthermore, it is possible to provide the carboxylic acid amide with a suitable emulsifier and to mix it directly with the molten paraffin on site, if necessary by highly turbulent mixing.

The dispersions that are produced may contain anionic, cationic or nonionic emulsifiers. Emulsifiers are surface-active amphoteric substances or high-molecular substances. Emulsifiers that may be mentioned include:
  alcohol polyethylene glycol ethers, e.g., those of general formula R—O—(R$^1$—O)$_n$—H,
  fatty acid ester polyethylene glycol ethers, e.g., those of the general formula R—COO—(R$^1$—O)$_n$—H,
  alkylpolyalkylene glycol ether carboxylic acids, e.g., those of the general formula R—O—(R$^1$—O)$_n$—CH$_2$—COOH and/or their alkanol ammonium or alkali metal salts or alkaline earth metal salts,
  alkylaminoalkylbetaines, e.g., those of the general formula R—CONH(CH$_2$)$_u$N$^+$(CH$_3$)$_2$—CH$_2$—COO,
  amine oxides, e.g., those of the general formula R—NO(CH$_3$)$_2$, wherein
    R denotes a branched or linear, saturated or unsaturated C$_8$ to C$_{20}$ and/or C$_7$ to C$_{19}$ hydrocarbon radical,
    n denotes a number from 2 to 20,
    R$^1$ denotes an alkylene radical with two to four hydrocarbons, e.g., C$_2$H$_4$ or C$_3$H$_6$, optionally different n, and
    u denotes a number from 1 to 10,
  products from alkoxylation of triglycerides which are partially or completely esterified with C$_6$-C$_{22}$ fatty acids, wherein 2 to 4 mol alkoxylating agent is added per mol triglyceride,
  partially neutralized partial glycerides of monovalent or polyvalent C$_2$ to C$_{22}$ carboxylic acids, e.g., linoleic acid, stearic acid, isostearic acid, palmitic acid, lauric acid, caprylic acid, capric acid, citric acid and/or lactic acid,
  esters of polyglycerol, in which the carboxylic acid group preferably has 2 to 22 carbon atoms,
  C$_6$ to C$_{32}$ carboxylic acids, in particular C$_8$ to C$_{26}$ fatty acids are completely or partially saponified, in particular completely saponified, e.g., with amines or amine compounds such as diethanolamine.

Emulsifiers in the sense of the invention also include high-molecular substances such as gum arabic, gum ghatti or cellulose compounds.

The dispersion produced in this way may be added to other wax dispersions.

The subject matter of the invention also includes wood-based materials such as particleboard and fiberboard also containing the inventive hydrophobizing agent with the soft waxes and the carboxylic acid amide compound in addition to a binder such as urea-formaldehyde resin (UF resin), phenol-formaldehyde resin (PF resin), tannin-formaldehyde resin (TF resin) and/or binders based on isocyanate and/or diisocyanate (e.g., PMDI).

The main task of the waxes and/or paraffins is to delay the rate of swelling in thickness and/or rate of water uptake of the wood-based materials produced with them. This is important inasmuch as the chipboards and fiberboards must comply with certain limit values with regard to thickness, swelling and water uptake according to the relevant standards which usually cannot be met without adding a hydrophobizing agent. During production, the wax dispersion may be added to the wood chips and/or wood fibers before or after addition of the binder or may be added to the binder itself.

The present dispersion containing carboxylic acid amide is suitable for use as a hydrophobizing agent for wood-based materials which contain binders such as alkali-curing phenol-formaldehyde resins (PF resins) and tannin-formaldehyde resins (TF resins). The wax dispersion according to the teaching of the present invention may also be used in combination with adhesives based on 4,4-diphenylmethane-diisocyanates (PMDI). The binders are preferably formaldehyde-free.

Furthermore, the wax dispersion produced in this way may be added either alone or in mixture with other dispersions to the binder provided for the production of wood-based materials. In addition, the wax dispersion may be added to the lignocelluloses to be bonded before or after addition of the binder.

The wax dispersion of the present invention may be characterized in that 20 wt % to 90 wt % of all hydrocarbons and waxes in the wax dispersion are soft waxes.

The oil content in the sense of this invention is determined according to ASTM standard D3235 with the title: "Standard Test Method for Solvent Extractables in Petroleum Waxes." To do so, the sample portion is dissolved in a solvent (mixture of 50% methyl ethyl ketone and 50% toluene) and the solution is cooled to separate the paraffin and then filtered. After evaporating the solvent, the amount of oil in the filtrate by weight is determined by weighing the residue.

Figure 2:
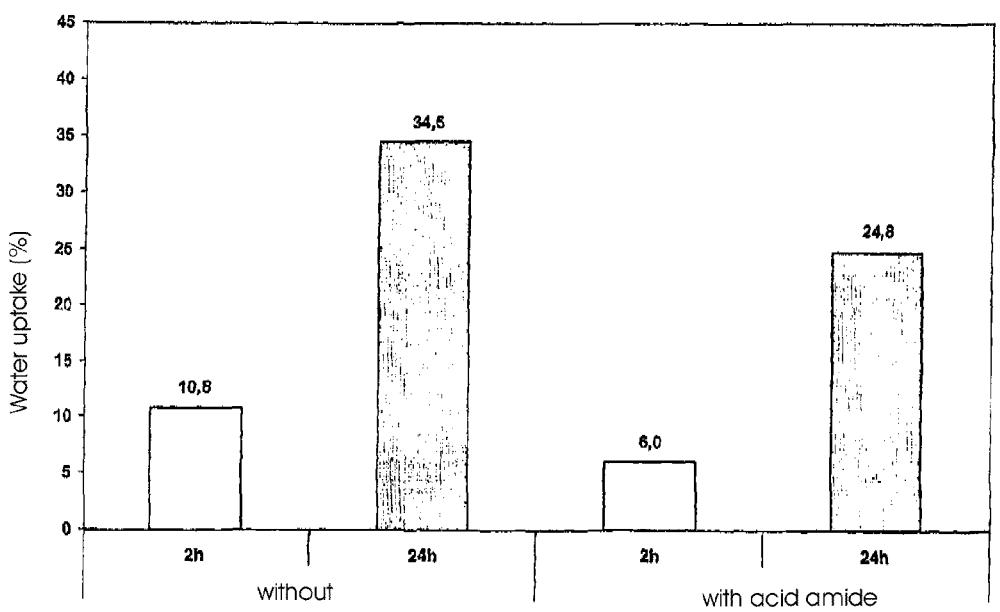
FIG. 2 is a graph similar to FIG. 1 showing the water uptake of the wood fiberboard with and without treatment with the composition of the present invention after 2 and 24 hour periods.

The invention is further explained by FIGS. 1 and 2.

FIG. 1 shows the swelling in thickness of wood fiberboard after storage in water for 2 and 24 hours, showing at the left the result obtained with wood-based fiberboard produced by using a wax without any carboxylic acid amide (comparative experiment) and at the right the result obtained with fiberboard produced using a wax containing carboxylic acid amide.

FIG. 2 shows the water uptake accordingly.

EXAMPLES

Soft paraffin wax with an oil content of more than 20 wt % was combined with an anionic emulsifier in water in which the pH had been slightly alkalized with ammonia, converting it to a wax dispersion. In another experiment, a carboxylic acid amide in the form of urea was added to the soft paraffin wax before preparing the aqueous dispersion.

|  | Comparative experiment (wt %) | Experiment (wt %) |
|---|---|---|
| Water: | 40.0 | 40.0 |
| Soft wax: | 56.5 | 54.5 |
| Emulsifier | 3.5 | 3.5 |
| Urea | — | 2.0 |

Specifically, an aqueous wax dispersion based on a soft wax (foots oil with 27% oil content) was prepared. The required amount of water at a temperature of approximately 80° C. was placed in a stirred vessel to prepare a predispersion. The anionic emulsifier (a $C_{20}$ fatty acid and diethanolamine) was added to the water while stirring and reacted. Then the corresponding amount of molten soft wax was added while stirring. After approximately 5 minutes, a pre-emulsion was formed while stirring. The pre-emulsion was then processed further using a high-pressure homogenizer at approximately 120 bar with subsequent cooling. Both wax dispersions were adjusted to a solids content of 60 wt %.

After the second and inventive experiment, 2 wt % acid amide in the form of urea was added to the soft wax dispersion during its preparation.

Wood-based fiberboards (MDF) were manufactured using two experimental dispersions and then were tested for their thickness swelling according to the relevant standards. The results show that despite the low wax content of wax dispersion 2, the swelling in thickness of the boards produced with this wax dispersion is much less than that in the case of wax dispersion 1. The amount of wax dispersion was the same in both cases. The results of this investigation are illustrated in FIGS. 1 and 2.

The invention claimed is:

1. An aqueous wax dispersion for a hydrophobizing agent in the production of wood-based materials comprising:
   a soft wax as solid phase or component of a solid phase, the soft wax comprising an oil content of greater than 20 wt %, wherein the soft wax is solid at a temperature above 10° C. and has a softening point of less than 65° C.; and from 0.5 wt % to 10 wt %, based on the wax dispersion, of urea.

2. The wax dispersion according to claim 1, characterized in that the soft wax has an oil content of greater than 25 wt %.

3. The wax dispersion according to claim 1, characterized in that said urea is present in aqueous solution in the wax dispersion.

4. The wax dispersion according to claim 1, characterized in that the soft waxes contain or are prepared from foots oil and/or slack waxes.

5. The wax dispersion according to claim 1, characterized in that the oil content in the soft waxes comprises hydrocarbons and the oil content comprises paraffinic lubricating oil.

6. The wax dispersion according to claim 1, characterized in that the soft waxes comprise more than 60 wt %, of the solid phase of the wax dispersion.

7. The wax dispersion according to claim 1, characterized in that 20 wt % to 90 wt %, of all hydrocarbons and waxes in the wax dispersion are soft waxes.

8. The wax dispersion according to claim 1, characterized in that the urea is present in the wax dispersion in the amount of 1 to 8 wt %.

9. The wax dispersion according to claim 1, characterized in that the wax dispersion contains soft waxes, including other waxes or hydrocarbons, in amounts of 10 to 70 wt %.

10. The wax dispersion according to claim 1, characterized in that the wax dispersion also comprises Fischer-Tropsch waxes and/or polyolefin waxes.

11. The wax composition according to claim 1, containing the soft waxes and urea in a weight ratio of 100 to 0.3 through 100 to 6, as the hydrophobizing agent for said wood-based materials.

12. The wax composition according to claim 1, characterized in that the wood-based materials are particleboards and fiberboards.

13. A hydrophobic wood-based material comprising:
   at least one binder;
   a wood-based material;
   a soft wax, the soft wax comprising an oil content of greater than 20 wt %, wherein the soft wax is solid at a temperature above 10° C. and has a softening point of less than 65° C.; and
   urea wherein the wood-based material comprises as a wood component, wood shavings, wood chippings, wood fibers, mixtures thereof and products made therefrom.

14. The wood-based material according to claim 13, characterized in that the wood-based material contains the soft waxes and urea in a weight ratio of 100 to 0.3 through 100 to 6.

15. The wood-based material according to claim 13, characterized in that the soft wax has an oil content of greater than 25 wt %.

16. The wood-based material according to claim 13, characterized in that the soft wax contains or is produced from foots oil and/or slack waxes.

17. The wood-based material according to claim 13, characterized in that the oil content in the soft wax comprises hydrocarbons and the oil content comprises paraffinic lubricating oil.

18. The wood-based material according to claim 13, characterized in that the wood-based material also contains Fischer-Tropsch waxes and/or polyolefin waxes.

19. The wood-based material according to claim 13, characterized in that an acid-curing urea-formaldehyde resin, an alkali-curing phenol-formaldehyde resin, a tannin-formaldehyde resin or a binder based on isocyanates and/or diisocyanates is used as the binder.

20. A method for producing wood-based materials hydrophobized with wax, comprising treating in any order lignocellulose containing material with:
   a soft wax, wherein the soft wax has an oil content greater than 20 wt %; and is solid at a temperature above 10° C. and has a softening point below 65° C., 0.5 wt % to 10 wt % of urea, and
at least one binder.

21. The method according to claim 20, characterized in that the binder is an acid-curing urea-formaldehyde resin, an alkali-curing phenol-formaldehyde resin, a tannin-formaldehyde resin or a binder based on isocyanate or diisocyanate, in particular an alkali-curing phenol-formaldehyde resin or an adhesive based on 4,4' diphenylmethane-diisocyanate.

22. The method according to claim 20, characterized in that the lignocellulose containing material is treated with the wax dispersion before adding the binder.

23. The method according to claim 20, characterized in that the soft waxes and the urea are added to the binder in the form of an aqueous composition in the form of a dispersion or as a spray mist, and the aqueous composition and binder are applied to the lignocellulose containing material.

24. The method according to at least one of claim 20, characterized in that the wax dispersion containing the urea is added after adding the binder.

25. The method according to claim 20, characterized in that the urea and the soft wax and/or the wax containing soft waxes is/are mixed, optionally with turbulence, immediately before treating the lignocellulose containing material.

26. The method according to claim 20, characterized in that the soft wax and the urea are used as hydrophobizing agents in the lignocellulose containing material in a weight ratio of 100 to 0.3 through 100 to 6, preferably 100 to 1 through 100 to 3.

27. The method according to claim 20, characterized in that the soft wax are added to the lignocellulose containing material in the amount of 0.1 to 3 wt %.

28. The method according to claim 20, characterized in that the lignocellulose containing material comprises wood shavings.

29. The wax dispersion of claim 1, wherein the soft wax comprises greater than 95 wt % of the solid phase of the wax dispersion.

30. The wax dispersion of claim 1, wherein the wax dispersion contains soft waxes, including other waxes or hydrocarbons, in amounts of 40 to 70 wt %.

* * * * *